(12) United States Patent
Xu et al.

(10) Patent No.: US 12,126,244 B2
(45) Date of Patent: Oct. 22, 2024

(54) POWER GENERATION UNIT AND POWER GENERATION DEVICE

(71) Applicant: Guangdong Ocean University, Zhanjiang (CN)

(72) Inventors: Qing Xu, Zhanjiang (CN); Haowei Li, Zhanjiang (CN); Shengxian Xian, Zhanjiang (CN); Xinxiang Pan, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/346,336

(22) Filed: Jul. 3, 2023

(65) Prior Publication Data
US 2023/0344309 A1 Oct. 26, 2023

Related U.S. Application Data

(63) Continuation of application No. PCT/CN2023/071854, filed on Jan. 12, 2023.

(30) Foreign Application Priority Data

Jan. 25, 2022 (CN) .......................... 202210083092.9

(51) Int. Cl.
H02K 7/18 (2006.01)
H02K 11/00 (2016.01)
H02K 11/04 (2016.01)
F03B 13/14 (2006.01)

(52) U.S. Cl.
CPC ....... *H02K 7/1876* (2013.01); *H02K 11/0094* (2013.01); *H02K 11/04* (2013.01); *F03B 13/14* (2013.01); *F05D 2220/76* (2013.01)

(58) Field of Classification Search
CPC ........................... H02K 5/225; F05D 2220/76
See application file for complete search history.

(56) References Cited

U.S. PATENT DOCUMENTS 4,492,875 A 1/1985 Rowe

FOREIGN PATENT DOCUMENTS

| CN | 102352811 A | 2/2012 |
| CN | 102808719 A | 12/2012 |
| CN | 202718803 U | 2/2013 |

(Continued)

OTHER PUBLICATIONS

Song, et al. "Conversion System of Ocean Buoys Based on Wave Energy" Journal of Mechanical Engineering, vol. 48, No. 12, Jun. 2012.

*Primary Examiner* — Sean Gugger

(57) ABSTRACT

A power generation unit and a power generation device are provided, belonging to the field of wave power generation. The power generation unit includes a housing, a magnet and an elastic assembly; the magnet is arranged inside the housing, the elastic assembly is arranged between the housing and the magnet, and the magnet and an inner wall of the housing are spaced apart. The housing includes an outer housing and an inner housing which are spaced apart, and the outer housing surrounds the inner housing, and an inner wall of the inner housing is circumferentially surrounded by an electromagnetic coil. The outer housing includes a first connection layer and a second connection layer which are laminated, and the inner housing includes a third connection layer and a fourth connection layer which are laminated.

8 Claims, 4 Drawing Sheets

(56) References Cited

FOREIGN PATENT DOCUMENTS

| | | |
|---|---|---|
| CN | 106849598 A | 6/2017 |
| CN | 106968871 A | 7/2017 |
| CN | 110138260 A | 8/2019 |
| CN | 114421731 A | 4/2022 |
| KR | 20140032548 A | 3/2014 |

POWER GENERATION UNIT AND POWER GENERATION DEVICE

CROSS-REFERENCE TO RELATED APPLICATIONS

This application is a continuation of PCT/CN2023/071854, filed on Jan. 12, 2023, which claims priority to Chinese Patent Application No. 202210083092.9, filed on Jan. 25, 2022, the contents of which are hereby incorporated by reference.

TECHNICAL FIELD

The present application belongs to the technical field of wave power generation, and in particular to a power generation unit and a power generation device.

BACKGROUND

Seawater is a fluid composed of numerous seawater particles. Under the action of external force, the seawater particles move periodically near their equilibrium points and forms waves.

Wave energy is a specific form of ocean energy, and it is also one of the most important energy sources in ocean energy. Development and utilization of the wave energy is very important to alleviate the energy crisis and reduce environmental pollution.

Most of the existing offshore wave power generation are single-float oscillation power generation methods, and have low utilization rate and conversion rate of wave energy.

SUMMARY

In view of this, it is an objective of the present application to provide a power generation unit and a power generation device in order to overcome the shortcomings in the prior art.

The application provides the following technical scheme.

A power generation unit includes a housing, a magnet and an elastic assembly.

The magnet is arranged inside the housing, the elastic assembly is are arranged between the housing and the magnet, and the magnet and an inner wall of the housing are spaced apart.

The housing includes an outer housing and an inner housing which are spaced apart, and the outer housing surrounds the inner housing, and an inner wall of the inner housing is circumferentially surrounded by an electromagnetic coil.

The outer housing includes a first connection layer and a second connection layer which are laminated, and the inner housing includes a third connection layer and a fourth connection layer which are laminated.

One end of the housing is provided with a first extraction electrode, and another end of the housing is provided with a second extraction electrode.

And/or the first connection layer and the fourth connection layer are respectively connected with the first extraction electrode, and the second connection layer and the third connection layer are respectively connected with the second extraction electrode.

In some embodiments of the present application, two ends of the housing are also respectively provided with a third extraction electrode and a fourth extraction electrode.

One end of the electromagnetic coil is connected with the third extraction electrode, and another end of the electromagnetic coil is connected with the fourth extraction electrode.

Optionally, the elastic assembly includes a plurality of first springs spaced, and the plurality of the first springs are all arranged in a circumferential direction of the magnet.

One end of each of the first springs is connected with the magnet, and another end of each of the first springs is connected with the inner wall of the housing.

Optionally, an included angle between any two of the first springs arranged adjacently ranges from 30° to 120°.

Optionally, two ends of the magnet are respectively provided with a second spring.

One end of each second spring is connected with the magnet, and another end of each second spring is connected with the inner wall of the housing.

Optionally, a buffer layer is arranged between the inner housing and the outer housing.

Optionally, the first connection layer covers the second connection layer.

The third connection layer covers the fourth connection layer.

Optionally, the first connection layer is made of any one of copper, silver and copper alloy, and the second connection layer is made of polyimide.

The third connection layer is made of any one of graphene, conductive carbon fiber and metal fiber, and the fourth connection layer is made of polyvinylidene fluoride.

Some embodiments of the application also provide a power generation device, which includes a rectifier and the power generation unit.

The power generation unit is electrically connected to the rectifier.

Optionally, the power generation device also includes a storage battery and a transformer, where the storage battery is electrically connected to the rectifier, and the transformer is electrically connected to the storage battery.

The embodiments of the application has the advantages that the outer housing of the power generation unit floating on the sea surface is deformed under the scouring of waves, and electrons are transferred between the first connection layer and the second connection layer to form a potential difference, and at the same time, induced charges are generated. During the deformation of the housing, mutual friction between the third connection layer and the fourth connection layer takes places, and electrons are transferred to form a potential difference, and at the same time, induced charges are generated. By connecting the first extraction electrode and the second extraction electrode with an external circuit, the induced charges of the outer housing and the inner housing flow through the external circuit to form a current driven by the potentials, thus converting wave energy into electrical energy. At the same time, the electromagnetic coil arranged in the housing cuts the magnetic field of the magnet to generate electromotive force, and the third extraction electrode and the fourth extraction electrode are connected with the external circuit to form an induced current, thereby converting wave energy into electrical energy, and greatly improving the utilization efficiency of wave energy.

BRIEF DESCRIPTION OF THE DRAWINGS

In order to explain the technical scheme of the embodiments of the present application more clearly, the following drawings will be briefly introduced. It should be understood that the following drawings only show some embodiments of the present application, so they should not be regarded as limiting the scope. For ordinary people in the field, other related drawings may be obtained according to these drawings without creative work.

DETAILED DESCRIPTION OF THE EMBODIMENTS

Figure 1:
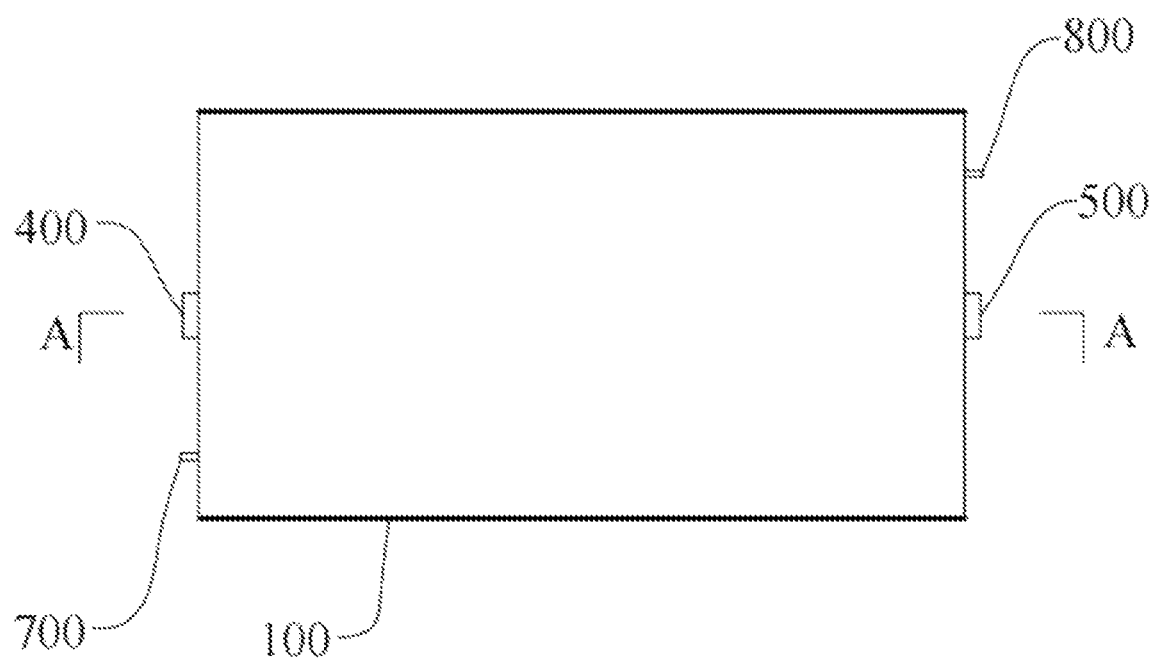
FIG. 1 shows a structural schematic diagram of a power generation unit provided by some embodiments of the present application from a view.

Embodiments of the present application will be described as follows in detail, examples of which are illustrated in the accompanying drawings, where the same or similar reference numerals indicate the same or similar elements or elements having the same or similar functions throughout. The embodiments described below by referring to the drawings are exemplary, only for explaining the application, and cannot be understood as limiting the application.

It should be noted that when an element is said to be "fixed" to another element, it may be directly on the other element or there may be an intervening element. When an element is considered to be "connected" to another element, it may be directly connected to another element or intervening elements may exist at the same time. Conversely, when an element is said to be "directly on" another element, there are no intervening elements. The terms "vertical", "horizontal", "left" and "right" and similar expressions used in this application are for illustrative purposes only.

In the present application, unless otherwise specified and limited, the terms "installation", "mutual connection", "connection" and "fixation" should be broadly understood. For example, they may be fixed connection, detachable connection or integrated; it may be a mechanical connection or an electrical connection, may be directly connected, may also be indirectly connected through an intermediary, may be the internal connection of two elements or the interaction between two elements. For those skilled in the field, the specific meanings of the above terms in the present application may be understood according to specific situations.

In addition, the terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of the present application, "a plurality of" means two or more, unless otherwise specifically defined.

Unless otherwise defined, all technical and scientific terms used herein have the same meaning as commonly understood by those skilled in the technical field of this application. The terminology used in the specification is only for the purpose of describing specific embodiments, and is not intended to limit the application. The term "and/or" as used herein includes any and all combinations of one or more related listed items.

Figure 2:
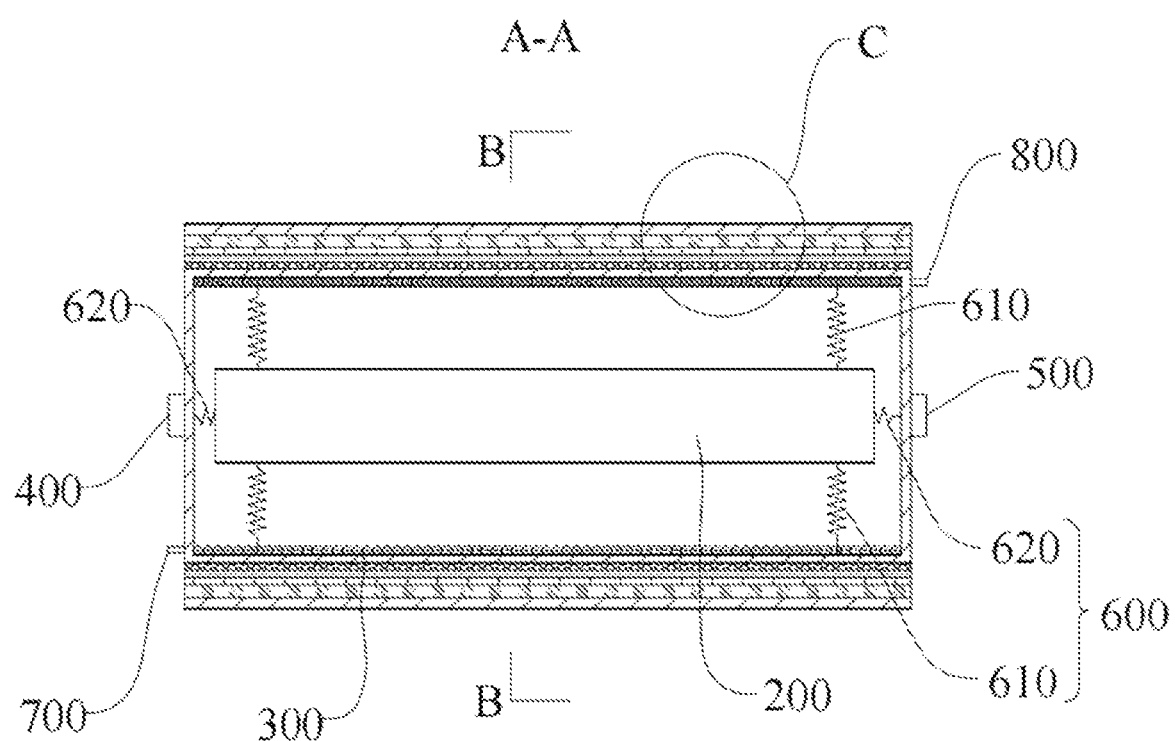
FIG. 2 shows a cross-sectional view along A-A in FIG. 1.
Figure 4:
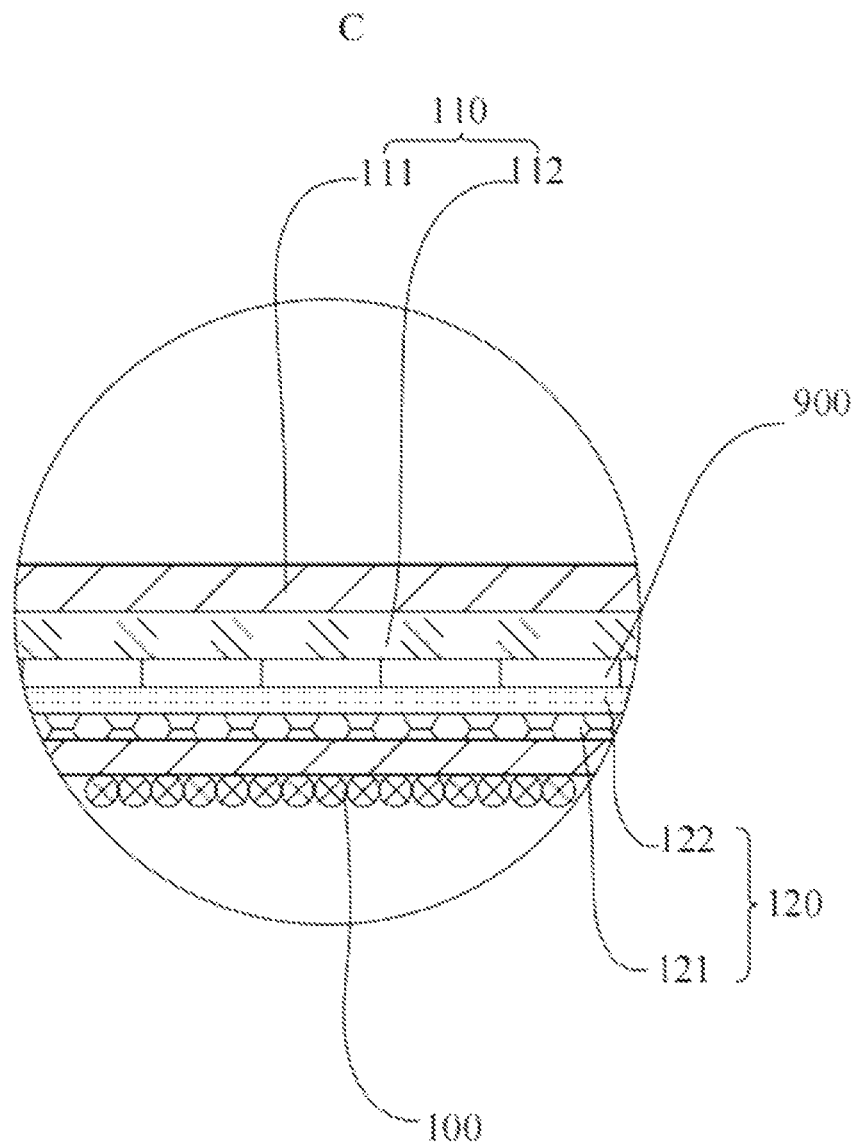
FIG. 4 shows an enlarged view of C in FIG. 2.

As shown in FIG. 1, FIG. 2 and FIG. 4, some embodiments of the present application provide a power generation unit mainly applied to the utilization of wave energy on the ocean to generate electricity through wave energy. The power generation unit includes a housing 100, a magnet 200 and an elastic assembly 600.

It should be noted that the housing 100 is a hollow sealed structure. Specifically, a shape of the housing 100 may be a hollow cylinder, ellipsoid, sphere, cube or special-shaped body, and may be specifically determined according to an actual situation. In some embodiments of the present application, the housing 100 has a hollow cylindrical structure.

In some embodiments of the present application, the magnet 200 is a permanent magnet.

In addition, a shape of the magnet 200 may be any one of a strip, a cylinder or a cuboid, and may be specifically determined according to the actual situation. In some embodiments of the present application, the magnet 200 is the cylinder.

By arranging the elastic assembly 600 between the housing 100 and the magnet 200, and making the magnet 200 spaced from the inner wall of the housing 100, it may be understood that the elastic assembly 600 provides elastic support for the magnet 200, so the magnet 200 is suspended inside the housing 100, and the magnet 200 swings inside the housing 100 under the elastic force of the elastic assembly 600.

An electromagnetic coil 300 is circumferentially surrounded on the inner wall of the housing 100, and the electromagnetic coil 300 is spaced from the magnet 200. It should be noted that the electromagnetic coil 300 surrounds the inner wall of the housing 100 with the axis of the housing 100 as the axis center. When the magnet 200 swings in the housing 100, the electromagnetic coil 300 cuts the magnetic field of the magnet 200 and generates a change in magnetic flux. The change in the magnetic flux generates an induced electromotive force. When the electromagnetic coil 300 communicates with an external load to form a closed loop, the closed loop generates an induced current, thereby supplying power to the external load.

Specifically, when the power generation unit is placed on the ocean, the power generation unit generates irregular shaking under the action of waves. At the same time, the magnet 200 arranged inside the housing 100 swings in the housing 100 along with the shaking of the housing 100. During the swinging process, the magnet 200 generates relative displacement with the electromagnetic coil 300 arranged on the inner wall of the housing 100, and the magnetic field generated by the magnet 200 is cut by the electromagnetic coil 300, and current is generated in the electromagnetic coil 300. When the two ends of the electromagnetic coil 300 are respectively communicated with the external load, the closed loop is formed, and the current generated by the electromagnetic coil 300 flows through the external load at this time, so as to supply power to the external load, thereby converting wave energy on the ocean into electrical energy.

In addition, the housing 100 includes an outer housing 110 and an inner housing 120 spaced apart, and the outer housing 110 surrounds the inner housing 120. It may be understood that the outer housing 110 and the inner housing 120 are hollow cylindrical structures, respectively, and the outer housing 110 is sleeved on the inner housing 120 in a spaced way, and the axis of the outer housing 110 coincides with the axis of the inner housing 120, respectively, and the axis of the outer housing 110 and the axis of the inner housing 120 coincide with the axis of the housing 100 respectively.

Specifically, the outer housing 110 includes a first connection layer 111 and a second connection layer 112 which are laminated. The first connection layer 111 covers the second connection layer 112, and the first connection layer 111 is made of any one of copper, silver and copper alloy. In some embodiments of the present application, the first connection layer 111 is made of red copper. In other words, the first connection layer 111 is a red copper layer. The second connection layer 112 is made of polyimide. In other words, the second connection layer 112 is a polyimide film layer.

It may be understood that the first connection layer 111 and the second connection layer 112 are hollow cylindrical structures, and the axis of the first connection layer 111 and the axis of the second connection layer 112 coincide with each other and coincide with the axis of the housing 100 respectively.

It should be noted that when the power generation unit floats on the sea surface, waves constantly scour and beat the surface of the housing 100. At this time, the inner housing 120 is deformed under the scouring and crashing action of waves, and electrons are transferred between the first connection layer 111 and the second connection layer 112, thereby generating a potential difference between the first connection layer 111 and the second connection layer 112.

Specifically, the first connection layer 111 and the second connection layer 112 are slightly deformed under the scouring of waves. According to the difference of gain and loss of electrons after material deformation, the electron potential on surface of the first connection layer 111 increases because of loss of electrons, and the electron potential on the surface of the second connection layer 112 decreases because of gain of electrons, forming the potential difference. When the first connection layer 111 and the second connection layer 112 are respectively communicated with the external load, the charge on the surface of the first connection layer 111 flows through the external load under the action of potential difference, and forms a current to supply power to the external load, thereby converting wave energy into electrical energy.

As shown in FIG. 2 and FIG. 4, in some embodiments of the present application, a buffer layer 900 is further provided between the outer housing 110 and the inner housing 120 in order to avoid irreversible deformation of the outer housing 110 when scoured by waves. The buffer layer 900 may be made of any one of PPE (polypheylene ether), TPU (thermoplastic polyurethanes rubber) and SBS (styrenic block copolymers) and may be specifically selected according to the actual situation.

In addition, the inner housing 120 includes a third connection layer 121 and a fourth connection layer 122, and the fourth connection layer 122 covers the third connection layer 121. Specifically, the third connection layer 121 is made of any one of graphene, conductive carbon fiber and metal fiber. In some embodiments of the present application, the third connection layer 121 is made of the conductive carbon fiber. In other words, the third connection layer 121 is a conductive carbon fiber layer. It should be noted that the conductive carbon fiber is a highly conductive material with excellent comprehensive properties. Besides high conductivity, the conductive carbon fiber also has corrosion resistance, wear resistance, high temperature resistance, high strength, light weight and so on.

The fourth connection layer 122 is made of polyvinylidene fluoride. In some embodiments of the present application, the fourth connection layer 122 is a polyvinylidene fluoride film layer. The polyvinylidene fluoride has the characteristics of the strongest toughness, low friction coefficient, strong corrosion resistance, aging resistance, weather resistance and good radiation resistance.

It may be understood that the third connection layer 121 and the fourth connection layer 122 are cylindrical structures respectively, and the axes of the third connection layer 121 and the fourth connection layer 122 coincide with each other and with the axis of the housing 100 respectively.

It should be noted that when the power generation unit floats on the ocean surface, the housing 100 is slightly deformed during the scouring and crashing of waves. At the same time, relative friction occurs between the third connection layer 121 and the fourth connection layer 122. According to the difference of gain and loss of electrons in different materials, the electron potential of the third connection layer 121 decreases because of the gain of electrons, and the electron potential of the fourth connection layer 122 increases because of the loss of electrons.

At this time, a potential difference is formed between the third connection layer 121 and the fourth connection layer 122. When the third connection layer 121 and the fourth connection layer 122 are respectively connected with an external load, the charges on the surfaces of the third connection layer 121 and the fourth connection layer 122 move directionally under the action of the potential, and flow through the external load to form a current, so as to supply power to the external load, thereby converting the wave energy into electrical energy.

In some embodiments of the present application, one end of the housing 100 is provided with a first extraction electrode 400, and the other end of the housing 100 is provided with a second extraction electrode 500. The first extraction electrode 400 and the second extraction electrode 500 are respectively communicated with an external circuit through wires.

It should be noted that when the power generation unit floats on the ocean, the first connection layer 111 and the fourth connection layer 122 lose the electrons respectively and potentials are increased, while the second connection layer 112 and the third connection layer 121 gain the electrons and potentials are decreased. The first connection layer 111 and the fourth connection layer 122 are respectively connected with the first extraction electrode 400, and the second connection layer 112 and the third connection layer 121 are respectively connected with the second extraction electrode 500, so that the charges in the outer housing 110 and the inner housing 120 flow in the same direction, thereby improving the utilization efficiency of wave energy by the power generation unit and improving the power generation efficiency. Therefore, the power generation unit may be used as supporting power generation equipment for offshore aquaculture and operation platforms, and may also generate electricity in groups in fixed sea areas and provide fast charging service for passing ships.

As shown in FIG. 1 and FIG. 2, in some embodiments of the present application, both ends of the housing 100 are further provided with a third extraction electrode 700 and a fourth extraction electrode 800, and at the same time, one end of the electromagnetic coil 300 is connected with the third extraction electrode 700, and the other end of the electromagnetic coil 300 is connected with the fourth extraction electrode 800. The third extraction electrode 700 and the fourth extraction electrode 800 are connected to the external load through wires.

Specifically, when the power generation unit floats on the sea surface, the power generation unit shakes irregularly on the sea surface under the action of waves. At the same time, the magnet 200 swings irregularly inside the housing 100, and the electromagnetic coil 300 cuts the magnetic field of the magnet 200 and generates an induced current. It should be noted that when the third extraction electrode 700 and the fourth extraction electrode 800 are connected with the external load through wires, the induced current is irregular alternating current.

In some embodiments of the present application, the third extraction electrode 700 and the fourth extraction electrode 800 may be electrically connected with the rectifier through wires respectively, and the alternating current generated by the electromagnetic coil 300 is converted into direct current through the rectifier, so as to supply power to the external load.

In addition, the axis of the magnet 200 is parallel to the axis of the housing 100, so as to increase the swing amplitude of the magnet 200 inside the housing 100 and improve the efficiency of the electromagnetic coil 300 in cutting the magnetic field generated by the magnet 200, thereby increasing the induced current generated by the electromagnetic coil 300.

Figure 3:
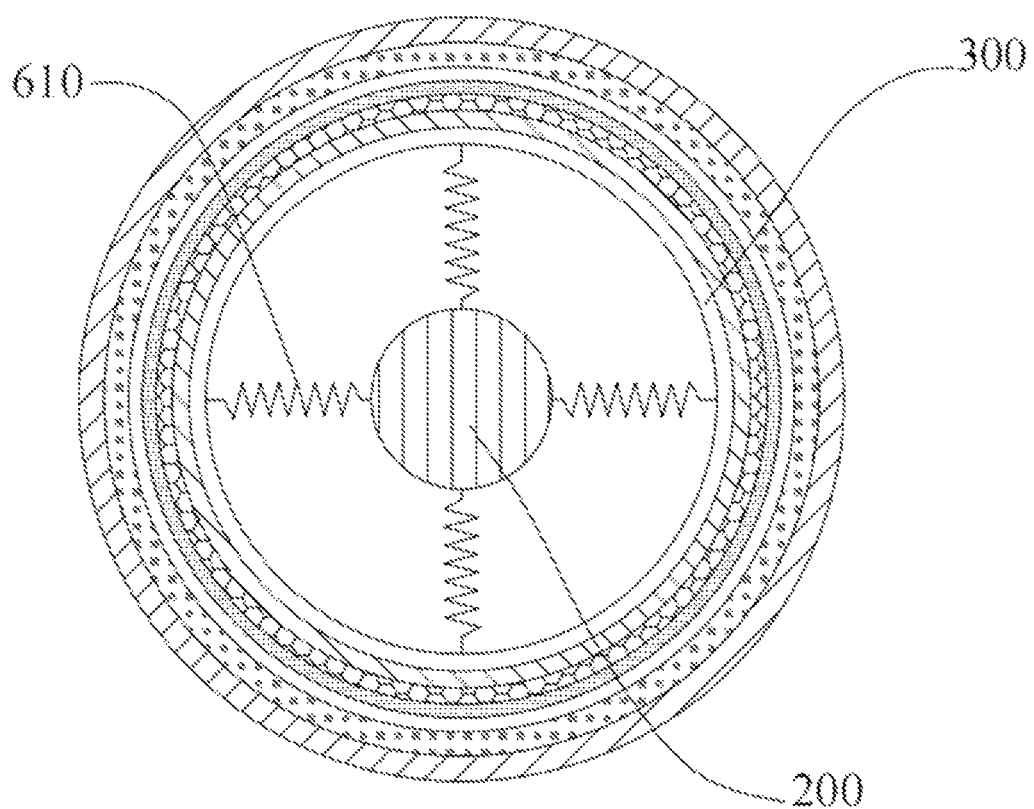
FIG. 3 shows a sectional view along B-B in FIG. 2.

As shown in FIG. 2 and FIG. 3, in some embodiments of the present application, the elastic assembly 600 includes a plurality of first springs 610 spaced. Each of the first springs 610 is arranged in the circumferential direction of the magnet 200, and one end of each of the first springs 610 is connected with the magnet 200, and the other end of each of the first springs 610 is connected with the inner wall of the housing 100, so that the magnet 200 is suspended inside the housing 100.

Specifically, in order to improve the stability of the magnet 200 inside the housing 100 and prevent the magnet 200 from colliding with the housing 100 during swinging, a plurality of the first springs 610 are respectively arranged at two ends of the magnet 200. The number of the first springs 610 may be specifically determined according to the actual situation.

The included angle between any two adjacent first springs 610 is 30° to 120°. Specifically, the included angle between any two adjacent first springs 610 may be any one of 30°, 45°, 60°, 90° and 120° and may be specifically determined according to the actual situation.

In some embodiments of the present application, in order to improve the swing uniformity of the magnet 200 inside the housing 100, the included angle between any two adjacent first springs 610 is 90°. The number of first springs 610 arranged at both ends of the magnet 200 is four respectively, and the distance between one end of one of the first springs 610 connected to the magnet 200 and the connecting ends of two adjacent first springs 610 connected to the magnet 200 is equal, and the distance between one end of one of first springs 610 connected to the inner wall of the housing 100 and the connecting ends of two adjacent first springs 610 connected to the inner wall of the housing 100 is equal.

It may be understood that the expansion and contraction directions of the first springs 610 is perpendicular to the axis of the magnet 200.

In addition, in order to improve the swing stability of the magnet 200 inside the housing 100, both ends of the magnet 200 are respectively provided with a second spring 620, one end of each second spring 620 is connected with the magnet 200, and the other end of each second spring 620 is connected with the inner wall of the housing 100, and the expansion and contraction directions of the second spring 620 are parallel to the axis of the magnet 200, so as to prevent the magnet 200 from colliding with the inner wall of the housing 100 when swinging inside the housing 100, thus improving the stability of the magnet 200 inside the housing 100.

Some embodiments of the present application also provide a power generation device. The power generation device includes a rectifier and the power generation unit described in any of the above embodiments, and the power generation unit is electrically connected to the rectifier.

Specifically, the first extraction electrode 400 and the second electrode arranged at both ends of the housing 100 are electrically connected to the rectifier through conductive leads, respectively, and the current generated by the power generation unit is rectified through the rectifier.

At the same time, the third extraction electrode 700 and the fourth extraction electrode 800, which are arranged at both ends of the housing 100, are also connected to the rectifier through conductive leads, and the alternating current generated by cutting the magnetic field by the electromagnetic coil 300 is converted into direct current through the rectifier, thereby supplying power to the load.

In addition, the power generation device also includes a storage battery and a transformer, where the storage battery is electrically connected with the rectifier, and the electrical energy generated by the power generation unit is stored as chemical energy of the storage battery through the storage battery, so that wave energy is converted into electrical energy.

At the same time, the storage battery is electrically connected with the transformer, and the electrical energy stored in the storage battery is transformed by the transformer to provide a stable voltage to the load, so as to realize the stability of power supply to the load.

In all the examples shown and described here, any specific value should be interpreted as illustrative only and not as a limitation, and therefore, other examples of exemplary embodiments may have different values. It should be noted that similar symbols and letters indicate similar items in the following drawings, so once an item is defined in one drawing, it does not need to be further defined and explained in subsequent drawings.

The above-mentioned embodiments are only several embodiments of the present application, and their descriptions are specific and detailed, but they should not be understood as limiting the scope of the present application. It should be pointed out that for those skilled in the art, without departing from the concept of the application, variations and improvements may be made and fall in the scope of protection of the application.

What is claimed is:

1. A power generation unit, comprising a housing, a magnet and an elastic assembly,
   wherein the magnet is arranged inside the housing, the elastic assembly is arranged between the housing and the magnet, and the magnet and an inner wall of the housing are spaced apart;
   the housing comprises an outer housing and an inner housing spaced apart, and the outer housing surrounds the inner housing, and an inner wall of the inner housing is circumferentially surrounded by an electromagnetic coil;
   the outer housing comprises a first connection layer and a second connection layer laminated, and the inner housing comprises a third connection layer and a fourth connection layer laminated;
   one end of the housing is provided with a first extraction electrode, and an other end of the housing is provided with a second extraction electrode;
   the first connection layer and the fourth connection layer are respectively connected with the first extraction electrode, and the second connection layer and the third connection layer are respectively connected with the second extraction electrode;

two ends of the housing are also respectively provided with a third extraction electrode and a fourth extraction electrode;

one end of the electromagnetic coil is connected with the third extraction electrode, and an other end of the electromagnetic coil is connected with the fourth extraction electrode;

a material of the first connection layer is any one of copper, silver and copper alloy, and a material of the second connection layer is polyimide; and a material of the third connection layer is any one of graphene, conductive carbon fiber and metal fiber, and a material of the fourth connection layer is polyvinylidene fluoride.

2. The power generation unit according to claim 1, wherein the elastic assembly comprises a plurality of first springs spaced, and the plurality of first springs are all arranged in a circumferential direction of the magnet;

one end of each of the first springs is connected with the magnet, and an other end of each of the first springs is connected with the inner wall of the housing.

3. The power generation unit according to claim 2, wherein an included angle between any adjacent two of the first springs ranges from 30°-120°.

4. The power generation unit according to claim 1, wherein two ends of the magnet are respectively provided with a second spring;

one end of each the second spring is connected with the magnet, and an other end of each the second spring is connected with the inner wall of the housing.

5. The power generation unit according to claim 1, wherein a buffer layer is arranged between the inner housing and the outer housing.

6. The power generation unit according to claim 1, wherein the first connection layer covers the second connection layer; and the third connection layer covers the fourth connection layer.

7. A power generation device, comprising a rectifier and the power generation unit according to claim 1, wherein the power generation unit is electrically connected to the rectifier.

8. The power generation device according to claim 7, wherein the power generation device further comprises a storage battery and a transformer, wherein the storage battery is electrically connected to the rectifier, and the transformer is electrically connected to the storage battery.

\* \* \* \* \*